MAGNETIC CORE MATRIX MULTIPLIER FOR OBTAINING THE DOT PRODUCT OF A PLURALITY OF VECTORS

Filed Sept. 19, 1966

INVENTOR.
CHARLES A. ROSEN
BY Samuel Lindenberg
Arthur Frailich
ATTORNEYS 3,470,369

MAGNETIC CORE MATRIX MULTIPLIER FOR OBTAINING THE DOT PRODUCT OF A PLURALITY OF VECTORS

Charles A. Rosen, Atherton, Calif., assignor to Stanford Research Institute, Menlo Park, Calif., a corporation of California Filed Sept. 19, 1966, Ser. No. 580,277
Int. Cl. G06g 7/16; H01f 27/42, 31/06
U.S. Cl. 235—194 8 Claims

ABSTRACT OF THE DISCLOSURE

An arrangement is provided for obtaining the dot product of a plurality of vectors. A magnetic core matrix is employed and the components of a first vector are read into one row of cores by applying pulsed DC currents. Simultaneously, the cores of that row are subjected to a radio frequency current to enable the cores to assume the DC pulse current magnitudes representative of the first vector. Next the components of a second vector are applied to the same row of cores employing a magnetic flux derived from AC currents wherein the currents have a magnitude representative of the second vector. Simultaneously with the application of the second vector, a third alternating current is applied to all the cores of the row. A readout wire threading all the cores in the row has induced in it a voltage which is the sum of the product components from each core, which is therefore equal to the dot product of the two vectors which were inputed to the cores.

This invention relates to magnetic devices for performing arithmetical operations, and more particularly to novel arrangements of such devices for performing complex mathematical operations.

An object of the invention is the provision of a novel arrangement of magnetic devices for obtaining dot products of vectors.

Another object of the invention is the provision of a novel arrangement of magnetic devices for obtaining the dot product of one vector with itself and the dot product of the same vector with a second vector.

Still another object of the invention is to provide a novel arrangement of magnetic devices for obtaining dot products of one vector with any one of a plurality of other vectors.

The foregoing and other objects are realized in an arrangement including a matrix of magnetic cores having substantially square loop hysteresis characteristics. The matrix is arranged in columns and rows of cores. The components of a first vector $\vec{W}$, are read into one row of cores by applying pulsed D.C. currents, each core receiving pulses of a magnitude equal to the corresponding $w$ component of $\vec{W}$. Simultaneously, all cores of that row are subjected to a radio frequency alternating current, to enable the cores to be permanently magnetized according to the D.C. pulse magnitudes.

Next, the components of a second vector $\vec{X}$ are applied to the cores of the same row by applying magnetic flux of alternating currents to each one, each core receiving a current of a magnitude equal to the corresponding $x$ component of $\vec{X}$. Simultaneously with application of the $x$-proportional currents, another alternating current is applied to all cores of the row. A readout wire threading all of the cores in the row has a $wx$ voltage induced in it at each core, the total voltage induced in the readout wire being the sum of the $wx$ components, i.e., $w, x,+w_2x_2+ \ldots \vec{W}_n\vec{X}_n$, which is equal to the dot product of the vector $\vec{W}$ and $\vec{X}$, indicated as $\vec{W}\cdot\vec{X}$.

The apparatus of the invention also allows for the obtaining of the dot product of a vector taken with itself, for example, $\vec{W}\cdot\vec{W}$. Such dot products are often required in complex learning machine applications along with the dot product of the vector $\vec{W}$ with another vector. The dot product $\vec{W}\cdot\vec{W}$ is obtained by providing a second matrix of cores. One core of the first matrix is inductively tied to one core of the second matrix by a loop of wire threading both cores. The same components of vector $\vec{W}$ are read into the second matrix core of each pair as are read into the first matrix core, so both are similarly magnetized.

During application of the second vector $\vec{X}$ to the first core of a pair, this vector $\vec{X}$ is not applied to the second core of the pair. Instead, two alternating currents are applied to the cores of the second matrix, the same alternating currents being applied to each of the cores. These two alternating currents induce a current in the loop of the wire proportional to the first vector components $w$. The loop currents combine with $w$ components set up by the first matrix cores to provide a $w^2$ component in the readout wire. The sum of the $w^2$ components in the dot product of $w$ taken with itself, that is $\vec{W}\cdot\vec{W}$. The $\vec{X}\cdot\vec{W}$ product can be distinguished from the $\vec{W}\cdot\vec{W}$ product on the readout wire, because each is present as the amplitude of an R.F. signal of different frequency. By connecting the readout wires to band-pass filters, the $\vec{X}\cdot\vec{W}$ signal can be separated from the $\vec{W}\cdot\vec{W}$ signals.

The apparatus of the invention also enables the obtaining of the dot products of one vector $\vec{X}$ with each of several vectors $\vec{W}_1$, $\vec{W}_2$, and so forth. Such combinations, where one vector is the same for the whole series of dot products, is often necessary in complex learning machine applications. They are obtained by providing many rows of cores. Each row of cores is magnetized at a separate time, and the row represents only one vector $\vec{W}$, each core of the row representing one component the vector. In order to magnetize only one row of cores, only that row is coupled to an R.F. alternating current when the D.C. pulses are coupled to all cores. Only those cores subjected to both a D.C. pulse and an R.F. current have their permanent magnetism changed.

A first vector $\vec{W}_1$ is entered into the first row of cores by sending R.F. alternating currents only through wires threading the first row. Then a second vector $\vec{W}_2$ is entered into the second row of cores by sending R.F. currents through that row, and the other vectors $\vec{W}_3$ through $\vec{W}_n$ are similarly entered into the rows 3 through $n$.

The dot product of each vector $\vec{W}_1$ through $\vec{W}_n$ with one vector $\vec{X}$ is accomplished by sending R.F. alternating currents through wires threading each of the rows 1 through $n$ when the $\vec{X}$ vector currents are applied. A separate readout wire for each row carries the dot product of $\vec{X}$ with the $\vec{W}$ vector recorded in the cores of that row. Thus, the dot products $\vec{X}\cdot\vec{W}_1$, $\vec{X}\cdot\vec{W}_2$ . . . $\vec{X}\cdot\vec{W}_n$ are all obtained simultaneously by the apparatus of the invention.

The novel features that are considered characteristic of this invention are set forth with particularly in the appended claims. The invention itself both as to its organization and method of operation, as well as additional objects and advantages thereof, will best be understood from the following description when read in connection with the accompanying drawings, in which:

It has been found that a magnetic core of square hysteresis loop can store an analog quantity which can be readout non-destructively. A core may be prepared to be magnetized to store an analog quantity by providing a radio frequency carrier signal, for example, on the order of 100 kilocycles, on a wire threading the core, but of insufficient amplitude to disturb the hysteresis state of the core. However, by applying a direct current pulse of another wire threading the core, simultaneously with the application of the R.F. carrier, the core is magnetized to a degree dependent upon the magnitude and duration of the direct current pulse or pulses.

The state of the core, or in other words the analog quantity stored, can be determined by applying the R.F. carrier alone to one winding and measuring the second harmonic output induced in another winding, the amplitude of the second harmonic being proportional to the stored quantity and also, of course, to the amplitude of the R.F. carrier. Similarly, if two R.F. carriers of different frequencies are applied to the core, products of the two R.F. carriers appear on a readout wire threading the core, with the usual sum and difference frequencies, and of amplitudes proportional to the products of the two R.F. carrier amplitudes and the stored quantity. Thus, one may obtain the product of two or three quantities with magnetic core circuits.

In some learning machines it is necessary to compute the dot product of two vectors, e.g. $\vec{X}\cdot\vec{W}$, or of one vector taken with itself, e.g. $\vec{W}\cdot\vec{W}$. The dot product of a vector $\vec{X}=ax+by+cz$, where $x$, $y$ and $z$ represent three directions, for example, and a vector $\vec{W}=dx+cy+fz$, is written as $\vec{X}\cdot\vec{W}$, and is equal to $ad+bc+cf$. $\vec{W}\cdot\vec{W}$ would equal $d^2+c^2+f^2$. Such dot products which normally contain a large number of components, are provided by the circuit represented in FIGURE 1.

Figure 1:
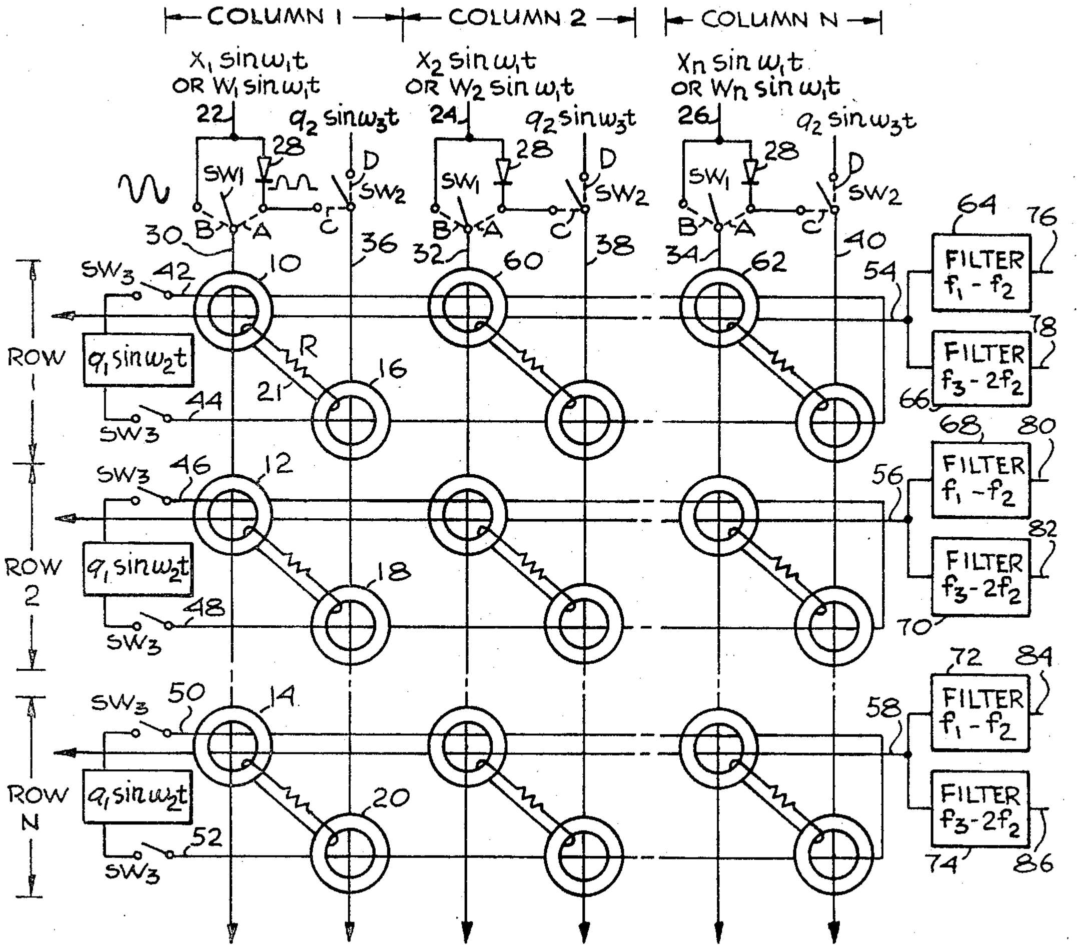
FIGURE 1 is a circuit diagram of one embodiment of the invention.

The circuit of FIGURE 1 comprises two matrices, of magnetic cores arranged in corresponding rows and columns. Cores 10, 12 and 14 are in column 1 of the first matrix. Cores 16, 18 and 20 are located in column 1 of the second matrix. The other cores are located in rows and columns as indicated. Conductor loops 21 tie corresponding cores of the two matrices together. Each loop has a sufficient resistance R to prevent such close coupling that changes of magnetization are caused by currents in the loop, yet moderately high coupling is provided.

In order to obtain a dot product $W\cdot X$, where $W=w_1j_1+w_2j_2+ \ldots w_nj_n$, and $$X=x_1j_1+x_2j_2+ \ldots x_nj_n$$

and where the quantities $w$ represent amplitudes of the component $j$, the vector $\vec{W}$ is first entered into the circuit, This is accomplished by connecting sources of currents $w_1 \sin \omega_1 t_1$ and $w_n \sin \omega_1 t$ to the lines 22, 24 and 26, respectively, and all intermediate lines. The switches $sw_1$ are all thrown to position A, so that pulsed D.C. voltages pass through diodes 28 to column wires 30, 32 and 34. Also, switches $sw_2$ are all thrown to position C so that the same D.C. pulses flow through column wires 36, 38 and 40 as flowed through wires 30, 32 and 34. Simultaneously with the application of the D.C. pulses, switches $sw_3$ of row 1 are closed to cause currents $a_1 \sin \omega_2$ to flow through rows 1 of the cores of both matrices by flowing through row wires 42, and 44.

The simultaneous application of D.C. pulses of amplitude $w_1$ through $w_n$ and the alternating currents $a_1 \sin \omega_2 t$ cause those cores receiving both signals to be permanently magnetized to a value proportional to the $w$ pulse amplitudes. Thus, storage of the components of $\vec{W}$ is made in row 1 of the two matrices of cores.

Next, the vector $\vec{X}$ is taken account of by connecting sources of currents $x_1 \sin \omega_1 t_1$ $x_2 \sin \omega_1 t_1$ and $x_n \sin \omega_1 t$ to the lines 22, 24 and 26 respectively, and similar currents to all intermediate lines, in place of the $w \sin \omega_1 t$ signals. The switches $sw_1$ are all placed in position D so that currents $a_2 \sin \omega_3 t$ flow through all column wires such as 36, 38 and 50 of the second matrix of cores. At the same time all switches $sw_3$ are closed to send currents $a_1 \sin \omega_2 t$ through all cores, not just certain selected rows.

While currents $x \sin \omega_1 t_1$ $a_1 \sin \omega_3 t$ and $a_2 \sin \omega_2 t$ are flowing, currents are induced in readout wires 54, which threads row 1 of cores of the first matrix. One of the currents induced in the readout wire 54 at each core it threads is proportioned to $a_1 xw \sin (\omega_1-\omega_2)t$, with the value of $x$ and $w$ being equal (actually proportional, but these terms are read simultaneously here) to the $x$ and $w$ components of that core. For example, the portion of readout wire 54 threading core 10 which is in the first column and first row, is $a_1x_1w_1 \sin (\omega_1\omega_2)t$. The terms $a_1$ and $x_1$ arise by reason of the amplitudes of the alternating currents flowing while the readout signal is being taken and $w_1$ is present because the core 10 was permanently magnetized to a value $w_1$ by virtue of closing of switches $sw_3$ at row 1 when $w \sin \omega_1 t$ D.C. pulses were being delivered. At each of the other cores of row 1 of the first matrix additional voltages are induced in readout wire 54. For example, at core 60 a voltage $a_1x_2w_2 \sin (\omega_1-\omega_2)t$ is induced in the wire 54. The total voltage on readout wire 54 of frequency $f_1-f_2$ (due to the $\sin (\omega_1-\omega_2)$ component) is equal to the sum $$a_1(x_1w_1+x_2w_2+ \ldots x_nw_n)$$

which proportional to the dot product $\vec{X}\cdot\vec{W}$.

which are equal to $a_1$ times $\vec{X}\cdot\vec{W}$. Since $a_1$ is known, the

The signal on readout wire 54 is delivered to filter 64 which passes only the components of frequency $f_1-f_2$, output of filter 64 yields the dot product $\vec{X}\cdot\vec{W}$.

The apparatus of FIGURE 1 also provides the dot product $\vec{W}\cdot\vec{W}$. Currents $a_2 \sin \omega_3 t$ are carried by column wires such as 36, 38 and 40 which thread each core of the second matrix, and currents $a_1 \sin \omega_2 t$ are carried by row wires such as 44, 48 and 52 which thread each core of the second matrix. As a result, there is induced in each loop 21 which ties corresponding cores of the first and second matrix together, a voltage equal to $w_1a_1a_2 \sin (\omega_3-\omega_2)t$. For example, a current $w_1a_1a_2 \sin (\omega_3-\omega_2)t$ is induced, in the portion of loop 21 threading core 16, provided that core 16 was permanently magnetized to a value $\vec{W}$, by virtue of closing of switches $sw_3$ at row 1 when $w_1 \sin \omega_1 t$ D.C. pulses were being delivered.

The currents $wa_1a_2 \sin(\omega_3-\omega_2)t$ are transmitted from loops 21 to the cores of the first matrix, such as core 10. The interaction of these currents with the currents $a_1 \sin \omega_2 t$ threading the cores of the first matrix, and existing magnetization to a value of $w$ of the cores, induces a component $w^2a_1^2a_2 \sin(\omega_3-{}^2\omega_2)t$ in the readout wires at each core. For example, a voltage $w_1^2a_1^2a_2 \sin(\omega_3-{}^2\omega_2)t$ is induced in readout wire 54 at core 10.

The voltages $w^2a_1^2a_2 \sin(\omega_3-{}^2\omega_2)t$ induced in the readout wires 54, at each core, form a sum voltage on the wire 54 of frequency $f_3-2f_2$ and of amplitude $$a_1^2a_2(w_1^2+w_2^2+ \ldots w_n^2)$$

This amplitude component which is proportional to $\vec{W}\cdot\vec{W}$ (since $a_1^2$ and $a_2$ are known) passes through the filter 66. Thus, the dot product $\vec{W}\cdot\vec{W}$ is obtained on output 78 by the apparatus of the invention simultaneously with the dot product $\vec{W}\cdot\vec{X}$ on output 76.

In the apparatus of FIGURE 1 only one diode 28 is shown for each vector component input. However, another diode oriented in the opposite direction may be provided to enable negative components to be dealt with. The oppositely oriented diode, which is not shown in the figure, allows negative pulses to flow, and if such a diode is included, the switches $sw_1$ have a third position (not shown) which is utilized for negative components.

While many rows of cores are shown in the figure, only one row is needed to obtain $\vec{W}\cdot\vec{X}$ and $\vec{W}\cdot\vec{W}$ where only two vectors are involved. However, in many learning machine applications the dot product of one vector $\vec{X}$ with each of many vectors $\vec{W}$, through $\vec{W}_n$ must be obtained. The two dot products for each of the vectors $W_1$ through $\vec{W}_n$ with the same vector $\vec{X}$ can easily be obtained with the multi-row apparatus shown in the figure. First, each vector $\vec{W}$ is entered with one row of cores. For example, the vector $\vec{W}_1$ is entered by signals $w_1 \sin \omega_1 t_1$ $w_2 \sin \omega_1 t_1$ etc. to the lines 22, 24, etc., with each $w$ component being that of the vector $\vec{W}_1$, while switches $sw_1$ are in position A. These components of vector $\vec{W}_1$ are entered into the cores of row 1 (or any other selected row) by closing only the $sw_3$ switch of row 1 so that the currents $a_1 \sin \omega_2 t$ flow only through the row wires 42 and 44 of the cores of row 1. As a result only the cores of row 1 are permanently magnetized. Next a vector $\vec{W}_2$ is entered into the cores of row 2 by closing the $sw_3$ switches of only row 2 when D.C. pulses $w \sin \omega_2 t$ are delivered to the wires 22, 24, etc., the amplitudes $sw_1$ through $w_n$ of the pulse signals being the amplitudes of the $w_1$ through $w_n$ components of vector $\vec{W}_2$. The other vectors are entered into the other rows of core in a similar manner.

The dot product of each of the vectors $\vec{W}_1$ through $\vec{W}_n$, which have been entered into the cores, with one vector $\vec{X}$ is obtained in the same manner as described earlier for a single $\vec{W}$. When the wires 22, 24, etc., are connected to the $x \sin \omega_1 t$ component signals of $\vec{X}$, the switches $sw_1$ are put in position B, the switches $sw_2$ are placed in position D, and all $sw_3$ switches are closed. $\vec{X}.\vec{W}_1$ and $\vec{W}_1.\vec{W}_1$ are then delivered by filters 64 and 66 respectively, $\vec{X}.\vec{W}_2$ and $\vec{W}_2.\vec{W}_2$ are delivered by filters 68 and 70, etc. Thus, the apparatus of the invention provides numerous dot product of two vectors, for cases where one vector is the same for all dot products, and also provides dot products of each of many vectors taken with themselves.

Figure 2:
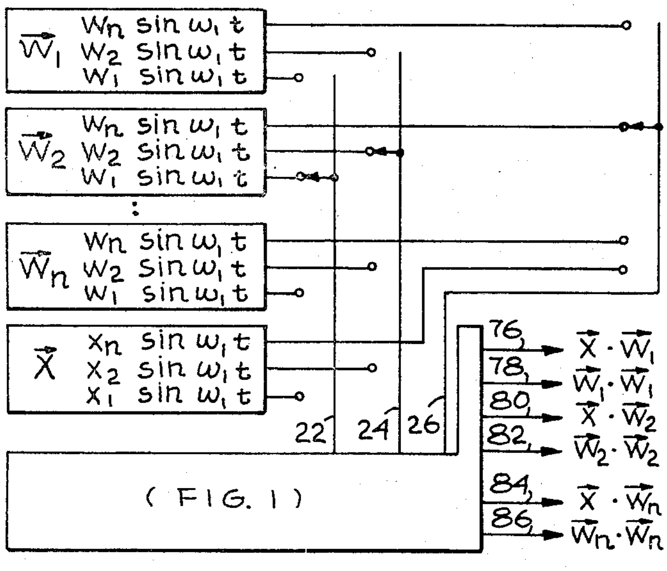
FIGURE 2 is a block diagram of the embodiment of the invention of FIGURE 1, showing the various inputs and outputs.

FIGURE 2 shows the currents representing vectors $\vec{W}_1$ through $\vec{W}_n$ and $\vec{X}$ delivered to the circuit of FIGURE 1 and dot product outputs $\vec{X}.\vec{W}_1$, $\vec{W}_1.\vec{W}_1$, $\vec{X}.\vec{W}_2$ etc. The other currents $a_1 \sin \omega_2 t$ and $a_2 \sin \omega_3 t$ used in the circuit can be generated by oscillators within the apparatus, and generally do not depend upon external factors.

This invention also provides an apparatus which can compute simultaneously the relative distances (Euclidean) between an $n$ dimensional point $\vec{X}$ from a bunch of points $\vec{W}_1, \vec{W}_2 \ldots \vec{W}_n$. To do so, let the distance $$d=(\vec{X}-\vec{W}_n).(\vec{X}-\vec{W}_n)$$
$$=\vec{X}.\vec{X}-2\vec{W}_n\vec{X}+\vec{W}_n.\vec{W}_n$$

Note that $\vec{X}.\vec{X}$ is the same for each $\vec{W}_n$ and therefore the relative distances are given by computing the dot products $\vec{W}_n.\vec{X}$ and $\vec{W}_n.\vec{W}_n$. It has been demonstrated hereinabove that this invention can perform this calculation.

There has accordingly been described and shown hereinabove a novel, useful and simple magnetic core apparatus for performing complex mathematical operations.

What is claimed is:

1. Apparatus for obtaining the dot product of a first vector and a second vector comprising:
   - a group of magnetizable cores;
   - direct current pulse generator means for providing direct current pulses to each of said cores, the magnitude of each of said pulses being proportional to the magnitude of one vector component of said first vector;
   - first conductor means passing through each of said cores;
   - first alternating current generator means connected to said conductor means for passing an alternating current therethrough while said direct current pulses are provided, whereby to cause a predetermined magnetization of said cores;
   - second alternating current generator means for providing alternating currents inductively coupled to each of said cores where each of said currents is of a magnitude proportional to the magnitude of vector components of said second vector, after said cores are magnetized by said direct current pulses; and
   - readout wire means inductively coupled to said cores for obtaining signals proportional to the sum of the products of corresponding components of said first and second vectors.

2. Apparatus as defined in claim 1 including:
   - a second group of magnetizable cores;
   - conductor loops threading pairs of cores, each pair including a core from each of said groups;
   - a plurality of second conductor means each inductively coupled to one of said cores of said second group and connectable to said direct current pulse generator means, for enabling a predetermined magnetization of said second cores in accordance with said first vector;
   - third alternating generator means inductively coupled to said second group of cores for generating a third alternating current, whereby to induce a current in each of said conductor loops proportional to the product of said vector components of said first vector and said third alternating current; and
   - filter means connected to said readout wire means for passing a component having a frequency component including the frequency of said third alternating currents whereby to obtain the dot product of said first vector taken with itself.

3. Apparatus as defined in claim 1 including:

a second group of magnetizable cores;

a fourth alternating current generator means inductively coupled to each of said cores of said second group;

switch means for selectively activating said second and fourth generator means;

a second readout wire means inductively coupled to all of the cores in said second group of cores;

a plurality of fifth direct current pulse generator means, one coupled to each of said cores of said second group, for providing currents proportional to the magnitude of vector components of a third vector to magnetize said second cores in accordance with said third vector; and wherein each of said second alternating current generator means is inductively coupled to one of said cores of said second group, whereby to obtain the dot product of said second vector with either said first or third vector.

4. A method for obtaining dot products comprising:

inductively coupling a first alternating current to each of a group of magnetic cores;

inductively coupling each of a plurality of second direct current pulse generator means to one of said cores simultaneously with said inductive coupling of said first alternating currents to said cores, each of said second direct current pulse generator means outputs representing one component of a first vector;

subsequently inductively coupling each of a plurality of third alternating current generator means to one of said cores, each of said third direct current pulse generator means outputs representing one component of a second vector; and maintaining inductive coupling of the flux of all of said cores in said group to a single readout conductor means during said step of inductively coupling each of a plurality of third alternating current generator means.

5. A method for obtaining dot products as defined in claim 4 including:

inductively coupling one alternating current to all of said cores simultaneously with said step of inductively coupling each of a plurality of third alternating current generator means.

6. A method as defined in claim 4 including:

inductively coupling each of said cores to one corresponding core of a second group of magnetic cores;

inductively coupling each of said second pulse generator means to a core of said second group so that corresponding cores of said first and second groups receive pulses from the same generator means;

inductively coupling an alternating current to said second cores simultaneously with said coupling of said second pulse generator means thereto; and inductively coupling a fourth alternating current to all of said cores of said second group and simultaneously coupling the magnetic fluxes of corresponding cores of said first and second groups of cores, whereby to induce in said readout conductor a dot product component of a vector taken with itself.

7. Apparatus for obtaining dot products comprising:

a matrix of magnetizable cores functionally arranged in columns and rows;

a plurality of column conductors, each column conductor threading the cores in one column;

a plurality of row conductors, each row conductor threading the cores in one row;

a plurality of readout conductors, each readout conductor threading the cores in one row;

first generator means connectable to said column conductors for delivering direct current pulses, the magnitude of pulses delivered to each column conductor being individually adjustable;

alternating current means selectively connectable to said row conductors; and second generator means connectable to said column conductors for delivering alternating current signals, the amplitude of each of said signals delivered to each column conductor being individually adjustable.

8. Apparatus as defined in claim 7 including:

a second matrix of cores arranged in functional columns and rows;

loop means for coupling corresponding pairs of cores, one from each matrix, together;

a plurality of second column conductors each of said column conductor threading the cores in one column of said second matrix;

a plurality of second row conductors, each of said row conductors threading the cores in one row of cores of said second matrix;

means for connecting said alternating current means selectively to said second row conductors; and a second alternating current means connectable to said second column conductors when said second generator means is connected to said column conductors.

References Cited

UNITED STATES PATENTS

| | | | |
|---|---|---|---|
| 3,029,415 | 4/1962 | Baldwin | 340—174 |
| 3,116,475 | 2/1963 | Oshima et al. | |
| 3,276,001 | 9/1966 | Crafts | 340—174 |
| 3,346,854 | 10/1967 | Crafts et al. | 340—174 |

MALCOLM A. MORRISON, Primary Examiner

J. F. RUGGIERO, Assistant Examiner

U.S. Cl. X.R.

307—88